United States Patent
Horn

[15] 3,656,969

[45] Apr. 18, 1972

[54] BREADED VEGETABLE METHOD

[72] Inventor: Herbert Horn, Mattoon, Ill.

[73] Assignee: Horn's Poultry, Inc.

[22] Filed: Nov. 3, 1969

[21] Appl. No.: 873,498

[52] U.S. Cl..................................................99/100, 99/193
[51] Int. Cl.........................................A23l 1/12, A23b 7/04
[58] Field of Search..............99/100, 100 P, 192, 193, 168, 99/93, 1

[56] References Cited

UNITED STATES PATENTS

| | | | |
|---|---|---|---|
| 1,706,491 | 3/1929 | Jenkins | 99/100 |
| 2,909,435 | 10/1959 | Watters et al. | 99/168 |
| 2,910,370 | 10/1959 | Rogers et al. | 99/168 X |
| 3,078,172 | 2/1963 | Libby | 99/100 X |
| 3,208,851 | 9/1965 | Antinori et al. | 99/100 X |
| 3,236,654 | 2/1966 | Lipka et al. | 99/93 |
| 3,449,132 | 6/1969 | Luksas et al. | 99/100 |
| 3,486,904 | 12/1969 | Ziegler | 99/1 |

*Primary Examiner*—Norman Yudkoff
*Assistant Examiner*—Kenneth Van Wyck
*Attorney*—Hofgren, Wegner, Allen, Stellman & McCord

[57] ABSTRACT

A breaded vegetable product, such as breaded pearl onion, is provided by covering the outer surface of a water-wet vegetable with wheat flour and applying a first coating of adherent batter. A fine breader is applied over the first batter coating and then a second batter coating is applied, e.g., by dipping. A final application of coarse breader is applied over the second batter coating and the coated vegetable is dried or permitted to dry and then laced on a stick, e.g., a bamboo skewer, and the combination is then frozen. The frozen product can be stored in frozen condition and later taken from storage and deep fat fried to produce a tasty snack.

1 Claim, No Drawings

BREADED VEGETABLE METHOD

FIELD OF THE INVENTION

The present invention relates to frozen breaded food products.

SUMMARY OF THE INVENTION

The present invention provides a new and useful food product and a method for preparing the same. The food product is a frozen combination of a breaded vegetable on a skewer. The product is prepared by applying batter to the outer surface of the vegetable, breading the batter-coated vegetable, impaling the vegetable with the skewer and freezing the resulting product. The product can be later removed from frozen storage and directly deep fat fried prior to eating.

DESCRIPTION OF THE PREFERRED EMBODIMENTS

In the preferred form, the vegetable is a pearl onion although other vegetables, such as potatoes, tomatoes, peppers and the like, can be processed as can slices or pieces of such vegetables. Usually, the vegetable, e. g., the pearl onion, is provided with a moist surface via natural moisture of the vegetable or by moistening the surface with water. The moist surface is then covered with a sufficient amount of flour, such as wheat flour, to absorb the moisture, e. g., by dipping in the flour. The flour-coated vegetable is then delivered through or dipped in a first application of liquid batter to coat the vegetable with adherent batter and then through a batter containing a fine breading mixture. The vegetable is then reprocessed through the batter to adhere another wet batter coating over the fine breading and is thereafter sent through another breader containing coarse breading as the final application of breading material. The breaded vegetable is permitted to dry, e. g., by standing for a period of 1½ to 2 minutes, and the product is then laced on a stick or bamboo skewer or the like and is frozen, e. g., to −40° F. The product can be stored in frozen condition and later used by deep fat frying to provide a tasty snack.

As a more specific example of the preparation of a food product according to this invention, the following fine and coarse breading materials and batter composition were prepared using the listed ingredients in the indicated amounts:

Fine Breading Material

| Ingredient | Amount, Weight Percent |
| --- | --- |
| Wheat Flour | 60 |
| Salt | 3 |
| Corn Flour | 30 |
| Cornstarch | 3 |
| Dextrose | 1 |
| Spice (mostly pepper) | 0.5 |
| Non-fat Dried Milk | 1 |
| Dried Egg | 1 |
| Vegetable Oil | 0.5 |
| Total: | 100 |

Coarse Breading Material

| Ingredient | Amount, Weight Percent |
| --- | --- |
| Wheat Flour | 90 |
| Dextrose | 2 |
| Leavening | 2 |
| Emulsified | 2 |
| Salt | 2 |
| Vegetable Shortening | 1 |
| Molto Dextrin | 0.25 |
| Non-fat Dry Milk | 0.25 |
| Flavor Enhancer | 0.25 |
| Spice (mostly pepper) | 0.15 |
| Hydrolyzed Vegetable Protein | 0.10 |
| Total: | 100 |

Batter Dry Mix

| Ingredient | Amount, Weight Percent |
| --- | --- |
| Corn Flour | 60 |
| Wheat Flour | 30 |
| Salt | 1 |
| Dried Whey | 0.5 |
| Leavening | 0.5 |
| Algin Gum | 0.1 |
| Soya Flour | 3 |
| Non-fat Dried Milk | 3 |
| Dried Whole Egg | 1 |
| Monosodium Glutamate | 0.5 |
| Spice (pepper) | 0.4 |
| Total: | 100 |

In order to provide a liquid or wet batter, two parts by weight water are added to the above batter dry mix per part by weight of dry mix.

A plurality of uncooked pearl onions were dipped in water until wet and then were tumbled in wheat flour until thoroughly coated with flour. The flour-coated onions were dipped in the liquid batter composition and delivered through a breader containing Fine Breading Material. The onions were recovered from the breader and again dipped in the liquid batter until coated and thereafter were delivered through a second breader containing the Coarse Breading Material. The breaded onions were permitted to dry for a period of 1 ½ to 2 minutes and were then laced on bamboo skewers using 1, 2 or even up to 5 or more onions per skewer. The combined breaded onion and skewer were frozen to −40° F.

The frozen onion-skewer products were removed from the freezer and deep fat fried until the breading was thoroughly browned and were then served on the skewer. They were eaten from the skewer and found to be delicious.

The vegetables useful in this invention are non-comminuted or whole vegetables and vegetable pieces or chunks which are usually uncooked. Conventional breading mixes and batters can be used. Usually the breading mixes will contain a major amount, e. g., 80 to 95 percent, of flour, the remainder being additive amounts of other ingredients. In the breadings and batter described above, the spice is mostly pepper although other spices can conveniently be used to taste. Using mostly pepper as the spice in the onion coated products results in a delicious food product. A major portion of the batter solids are also flour and batter usually includes thickening agents such as algin gum, leavening agents and a flavor enhancer such as monosodium glutamate to enhance the natural food flavor of the product. The vegetable oil, vegetable shortening, hydrolyzed vegetable protein and similar materials in the breading mixes are for the purpose of providing plasticity and a little, but pleasing amount of, oiliness to the breading after browning. The leavening is a temperature sensitive leavening agent which causes the batter and breading mixes to rise slightly during cooking, where leavening is used.

All percentages and parts given herein are by weight unless otherwise indicated.

The foregoing detailed description is given for clearness of understanding only and no unnecessary limitations are to be understood therefrom as some modifications will be obvious to those skilled in the art.

I claim the claim

1. A method of preparing a vegetable for cooking which comprises the steps of applying to the surface of the vegetable an adherent batter material comprising an aqueous dispersion of solids, a major portion of said solids being flour, wherein said solids include dried whey, leavening, algin gum, non-fat dried milk, dried whole eggs, monosodium glutamate and spice, breading over the battered vegetable with a fine breading material, then applying a second coating of said batter to the battered and breaded vegetable, and thereafter breading over said second batter with a coarse breading material, drying the so-breaded vegetable, then impaling the dried breaded vegetable on a bamboo skewer, and then freezing the skewered product.

* * * * *